(12) United States Patent
Wynne et al.

(10) Patent No.: US 8,048,952 B2
(45) Date of Patent: Nov. 1, 2011

(54) SILICONE OIL-IN-WATER EMULSIONS FORMULATION, PRODUCTION AND USE

(75) Inventors: Neil Wynne, Wrexham (GB); Michael Hudson, Wrexham (GB)

(73) Assignee: Wockhardt Limited, Mumbai (IN)

( * ) Notice: Subject to any disclaimer, the term of this patent is extended or adjusted under 35 U.S.C. 154(b) by 767 days.

(21) Appl. No.: 11/763,609

(22) Filed: Jun. 15, 2007

(65) Prior Publication Data

US 2007/0289492 A1 Dec. 20, 2007

Related U.S. Application Data

(60) Provisional application No. 60/815,033, filed on Jun. 20, 2006.

(30) Foreign Application Priority Data

Feb. 3, 2006 (IN) .......................... 166/MUM/2006

(51) Int. Cl.
*C08L 83/04* (2006.01)
(52) U.S. Cl. ....................................... 524/588; 428/447
(58) Field of Classification Search ................. 524/588; 428/447
See application file for complete search history.

(56) References Cited

U.S. PATENT DOCUMENTS

| | | | |
|---|---|---|---|
| 4,814,376 A * | 3/1989 | Tanaka et al. ................. | 524/588 |
| 4,874,547 A * | 10/1989 | Narula ............................ | 516/76 |
| 5,321,075 A | 6/1994 | Liles | |
| 5,443,760 A | 8/1995 | Kasprzak | |
| 6,126,954 A | 10/2000 | Tsaur | |
| 6,238,656 B1 | 5/2001 | Morita et al. | |
| 6,248,855 B1 | 6/2001 | Dalle et al. | |
| 6,267,842 B1 | 7/2001 | Ona et al. | |
| 6,300,442 B1 | 10/2001 | Plochocka et al. | |
| 6,784,144 B2 | 8/2004 | James | |
| 7,319,119 B2 * | 1/2008 | Mahr et al. ..................... | 524/588 |
| 2005/0107523 A1 * | 5/2005 | Gippert et al. ................ | 524/588 |

FOREIGN PATENT DOCUMENTS

| | | |
|---|---|---|
| WO | WO03/011948 A1 | 2/2003 |
| WO | WO03/064500 A2 | 8/2003 |
| WO | WO2004/100862 A2 | 11/2004 |
| WO | WO2005/105024 A1 | 11/2005 |

OTHER PUBLICATIONS

Bibette et al., "Stability Criteria for Emulsions", Phys. Rev. Lett., vol. 69, No. 16, pp. 2439-2443 (Oct. 19, 1992).

Liu et al, "Preparation and Applications of Silicone Emulsions Using Biopolymers", Chapter 11, pp. 309-328 in Elaissari, Ed., Colloidal Biomolecules, Biomaterials, and Biomedical Applications (CRC Press, 2004).

\* cited by examiner

*Primary Examiner* — Margaret Moore
(74) *Attorney, Agent, or Firm* — IPLM Group, P.A.

(57) ABSTRACT

The present invention provides a stable silicone oil-in-water emulsion substantially free of any additives. The emulsions of the invention can be stable for at least about fifteen (15) and preferably for at least about thirty (30) minutes. The emulsions of the invention are useful for the siliconization of glass container surfaces.

10 Claims, 2 Drawing Sheets

SILICONE OIL-IN-WATER EMULSIONS FORMULATION, PRODUCTION AND USE

CROSS-REFERENCE TO RELATED APPLICATIONS

This application claims priority from Indian Patent Application Serial No. 166/MUM/2006 filed Feb. 3, 2006, and from U.S. Provisional Patent Application Ser. No. 60/815,033 filed Jun. 20, 2006, which are incorporated herein by reference. This application is a CON of PCT/IB06/001602, filed Jun. 16, 2006.

FIELD OF THE INVENTION

This invention relates to a process for the preparation of stable silicone oil-in-water emulsions wherein the emulsion is substantially free of any additives.

BACKGROUND OF THE INVENTION

Siliconization of glass containers is often a necessary step prior to the packaging of pharmaceutical and cosmetic preparations. A concern when packaging preparations in glass containers, including bottles, injection cartridges, IV infusions, syringes, vials, etc., is that leaching of alkali from the glass components can occur. Sometimes described as "water attack", leaching can be a concern even for glass recommended for pharmaceutical preparations, viz., glass types I, II, and III. One of the most common causes of leaching is the extreme sterilization conditions that glass containers are generally subjected to prior to filling. Such conditions, for example, autoclaving, that requires heating the containers to about 121° C. using high steam pressure, and "baking" and/or oven sterilization, where glass containers can be subjected to temperatures exceeding 200° C., can result in considerable leaching of components from the glass. In addition, certain preparations, such as, for example, acidic drugs/cosmetics, can also promote leaching from glass. Thus, a common practice is to coat the surface of glass containers with silicone prior to their sterilization and filling. Silicone coating of glass containers, in addition to reducing the leaching of glass components, can also function as lubricants. Thus, a silicone coating can improve the drainage of fluids, and suspensions, especially viscous ones. The use of silicone coatings in containers is common for suspensions of steroids and combinations of penicillin and dihydrosterptomycin. Silicone can also be used in preparations in containers where the contents have high solid content, and formulation modifications cannot improve the drainage of the preparation from the containers. In addition, the inner surfaces of cartridges and syringes can be siliconized to allow free movement of the plunger through the cartridge or syringe. The outside of cartridges and syringes and other glass containers can also be siliconized to ease their transport through the steps in an assembly line, for example, through a sterilization setup. Siliconization typically involves application of, for example, by spraying, the silicone emulsion onto the surface of containers, usually as the last step of the cleaning protocol. After spraying with the emulsion, the containers are heat sterilized, which bakes the silicone oil onto the glass surface.

Several silicone oil-in-water emulsions are commercially available for the purposes of lubrication and siliconization of containers and delivery systems. However, the commercially available silicone oil-in-water emulsions usually contain several additives that may be of concern. The concerns arise because, a) these materials can degrade during heat sterilization, that often use temperatures in excess of 300° C., in the case of baking, and 121° C. with high steam pressure during autoclaving and b) the additives and the degraded components, could effect the stability of the preparation to be filled, and may also be incompatible with the preparations. In particular medicinal preparations, especially those containing peptides, proteins and alkaloids, may be highly susceptible to additives, as well as the degraded components, present in silicone-oil-in-water emulsions, For example, it is recommended that the baking conditions for the commonly used 35% Dimethicone NF emulsion not exceed 200° C. to avoid the possibility of oxidation and formation of formaldehyde. Over-baking an article treated with 35% Dimethicone NF emulsion can result in a cloudy appearance on the surface of the treated article.

U.S. Pat. No. 5,443,760 discloses an oil-in-water emulsion having a low HLB value. The compositions are prepared with silicone-oxyalkylene copolymeric surfactants.

U.S. Pat. No. 6,248,855 discloses a silicone oil-in-water emulsion containing a linear non-cross linked silicone copolymer prepared by polymerizing an OH endblocked polydimethylsiloxane monomer with an amine functional trialkoxysilane monomer in the presence of a metal catalyst. In the process the polymerization is interrupted by phase inversion emulsification of the copolymer, and addition of a carboxylic anhydride to avoid reverse depolymerization.

U.S. Pat. No. 6,300,442 discloses a process for making a cosmetically or pharmaceutically-acceptable emulsion or gel composition in which a reaction mixture comprising a vinyl monomer is heated in an oil solvent, such as silicone oil, in presence of a cross linking agent and an oil soluble surfactant, with agitation, in the presence of an inert gas, at about 40-150° C., followed by addition of water to form an form an oil-in-water, a water-in-oil or a water-in-oil-in-water emulsion or gel.

U.S. Pat. No. 6,784,144 describes a silicone oil emulsion stabilized with soap. The soap includes: one or more carboxylates of a fatty acid having from 8 to 18 carbon atoms; and a cation of a base, the soap being formed in situ from the fatty acid and the base during formation of the emulsion.

Published International Patent Application No. WO 2004/100862 discloses oil and water emulsions comprising silicone oil an electrosteric stabilizer and a polyol and/or hydroxy acid. The electrosteric stabilizer can be a copolymer of polyacrylate and alkylated polyacrylate.

Published International Patent Application No. WO 2005/105024 discloses silicone oil-in-water emulsions that are stabilized by a combination of silicone polyether and anionic surfactants. The resulting oil phase is dispersed in the emulsion as particles having an average size of less than 5 micrometers (μM).

Published International Patent Application No. WO 2003/011948 discloses emulsions of water, a volatile siloxane, long chain or high molecular weight silicone polyether, an optional co-surfactant such as, a monohydroxy alcohol, organic diol, an organic triol, an organic tetraol, a silicone diol, a silicone triol, a silicone tetraol and a nonionic organic surfactant.

Published International Patent Application No. WO 2003/064500 discloses compositions of silicone oil-in-water emulsions, having silicone polyethers that are stable in the presence of salts, alcohols and organic solvents. The silicone polyether can be the only emulsifier or in can be used in combination with other organic type surfactants.

Thus, there is a need for stable silicone oil-in-water emulsions wherein the emulsion is substantially free of any additives. In particular, there is a need for silicone oil-in-water emulsions, substantially free of any additives that are stable for an extended period of time.

SUMMARY

The present invention provides a stable silicone oil-in-water emulsion substantially free of any additives. The emulsions of the invention can be stable for at least about fifteen (15) and preferably for at least about thirty (30) minutes. The emulsions of the invention are useful for the siliconization of glass container surfaces.

In another embodiment, the invention provides a method for preparing a siliconized glass container (having a silicone coating) wherein the silicone coating is substantially free of any additives. In another embodiment, the invention provides a method for providing sterile siliconized glass containers wherein the silicone coating is substantially free of any additives. In another embodiment, the invention provides sterile siliconized glass containers containing medicinal preparations, wherein the silicone coating is substantially free of any additives, and wherein the medicinal preparations comprise peptide, proteins or alkaloids as the active medicinal component.

DETAILED DESCRIPTION

Figure 1:
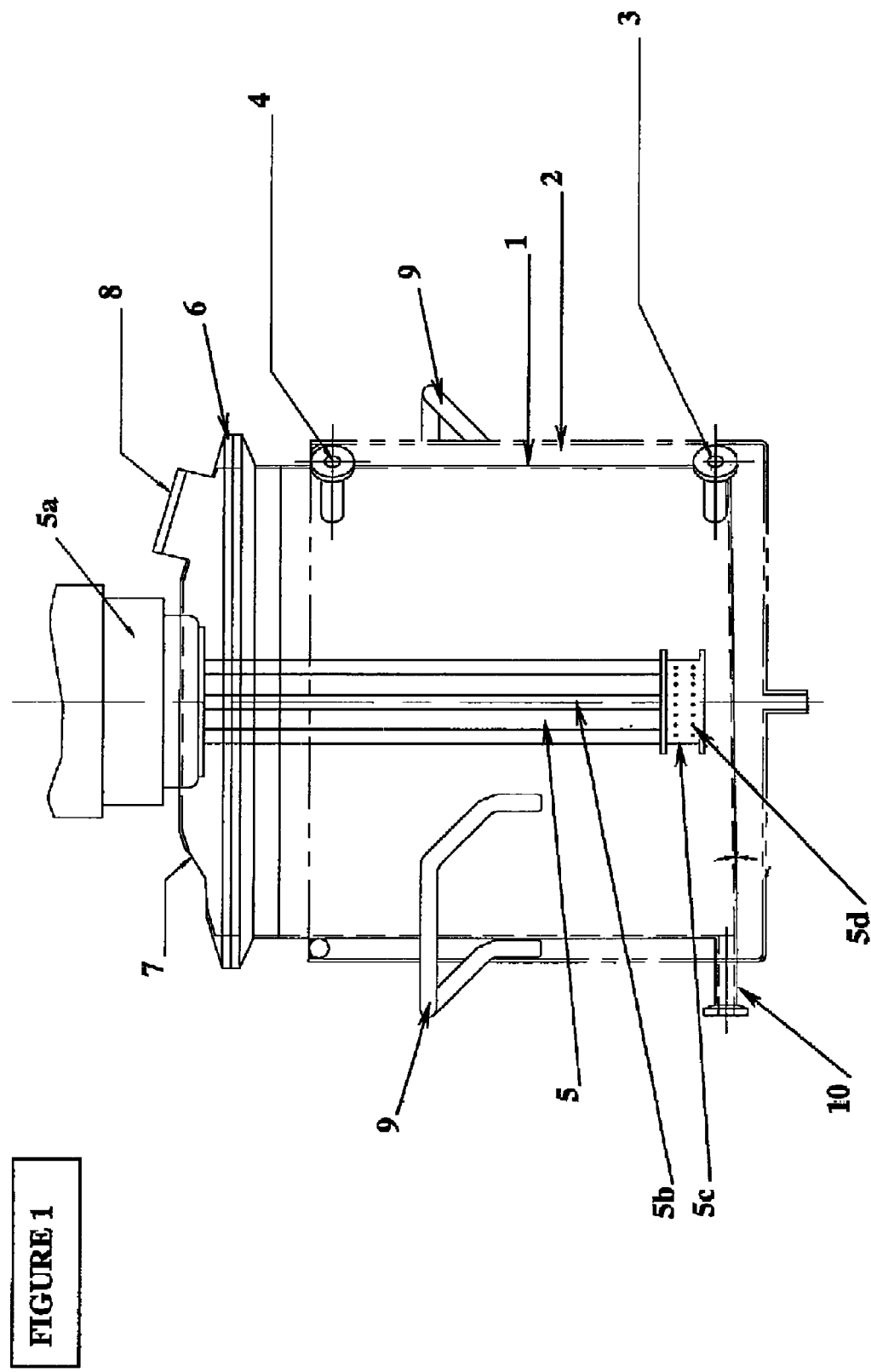
FIG. 1 is an illustration of the jacketed vessel with the inbuilt homogenizer-stirrer for production of the emulsion.

Coating of surfaces of glass containers with silicone oil is necessary to reduce the leaching of glass components that can occur as a result of either extreme sterilization conditions or due to the action of certain preparations that can promote leaching. In addition, the silicone emulsion coating can also function as a lubricant. Thus, the silicone coating can improve the drainage of fluids and suspensions from the container, the siliconized surfaces of cartridges and syringes can also aid the free movement of the plunger through the cartridge or syringe.

Commercially available silicone emulsions typically have one or more additives that can be of concern, because the additives can degrade at the high temperatures of sterilization that are commonly employed. The additives as well as the degraded products can also be incompatible with the container preparations, especially medicinal preparations comprising peptides, proteins or alkaloids as the active medicinal component.

Thus, it would be highly advantageous to have silicone oil-in-water emulsions that are substantially free of any additives and that are stable, viz. there is no separation of the silicone oil phase from the aqueous phase for at least about 15 minutes, preferably for about 20 minutes, and more preferably for about 30 minutes. The present invention provides a homogenous silicone oil-in-water emulsion that is substantially free of any additives and that is stable for at least about 15 minutes, a process for its production, and the use of such emulsions for the siliconization of containers. The present invention also provides glass containers, such as bottles, injection cartridges, IV infusions, syringes, vials etc., that have been siliconized using a silicone oil-in-water emulsion substantially free of any additives. The present invention further provides siliconized glass containers containing medicinal preparations, such as peptide, protein, or alkaloid, wherein the silicone coating is substantially free of any additives.

As used herein the terms "substantially free" and "substantially free of additives" means that the emulsions of the invention contain less than 0.01 weight % of additives such as, emulsifiers or stabilizers based on the weight of the silicon oil and water. Preferably, the emulsions of the invention contain less than 0.001 weight % of any additives. Thus, this invention provides a substantially pure homogenous silicone oil-in-water emulsion that is stable for at least about 15 minutes.

In another embodiment, of the present invention provides a homogenous stable silicone oil-in-water emulsion substantially free of any additives where the amount of silicone oil in the emulsion is from about 0.1% to about 6% by weight. Preferably, the amount of silicone oil in the emulsion is from about 0.5% to about 3% by weight. More preferably, the amount of silicone oil in the emulsion is from about 0.5% to about 2% by weight. In another embodiment, the invention provides a homogenous stable silicone oil-in-water emulsion substantially free of any additives, wherein the amount of silicone oil in the emulsion is about 1% by weight. Preferably, the amount of silicone oil in the emulsion is about 0.8% by weight.

In another embodiment, the present invention provides a process for the preparation of a homogenous stable silicone oil-in-water emulsion, substantially free of any additives. The process comprises the addition of silicone oil to water that is maintained at a low temperature, to reduce the tendency of the silicone oil droplets to coalesce and form an oil layer on the surface, and homogenization of the mixture, in the same or a different vessel, wherein said homogenization is carried out at a low temperature. Another embodiment of the process is that the emulsion is continually homogenized prior to application to the surface of the glass container. The homogenization carried out, at a temperature of less than about 20° C. Preferably, the homogenization temperature is less than about 15° C. More preferably, the homogenization temperature is less than about 12° C. Even more preferably, the homogenization temperature is less than about 10° C. Still even more preferably, the homogenization temperature is less than about 8° C.

In another embodiment, the present invention provides a vessel for producing a stable homogenous silicone oil-in-water emulsion, substantially free of any additives, having a built in homogenizer-stirrer, and which may be maintained at a low temperature. (See FIG. 1.) The silicone oil-in-water emulsion of the instant invention may be prepared or maintained in a vessel, preferably of steel, that is enclosed by a cooling jacket, also preferably of steel. The vessel contents may be maintained at a fixed temperature by continually circulating a coolant, such as glycol, through the jacket. Along the vertical axis of the vessel is a time-regulated homogenizer-stirrer, for carrying out optimum emulsification of the emulsion. The components of the homogenizer-stirrer include the homogenizer motor with a timer, the rotor, and present at the lower end of the rotor, rotor-blades. The rotor blades are enclosed by the homogenizer screen comprising orifices of sizes from about 0.5 mm to about 2.00 mm. When the homogenizer stirrer is switched on, the rotating rotor blades drive the emulsion through the orifices. This results in "breaking" the silicone oil into minute particles (oil droplets), which are easily dispersed in the emulsion. The minute particle size of the of the silicone oil droplets enhances the stability of the emulsion. The size oil droplets (minute particles) of the emulsions of the invention may be from about 5 microns to about 100 microns in diameter. Preferably, the oil droplets of the emulsion may be from about 10 microns to about 50 microns. The lid of the vessel comprises a port for addition of more silicone oil-in-water emulsion if necessary, and a viewing port. Also present on the surface of the vessel are handles and a product outlet. The amount of silicone oil in the oil-in-water emulsions is from about 0.1% to about 6% by weight. Preferably, the amount of silicone oil in the emulsion is from about 0.5% to about 3% by weight. More preferably, the amount of silicone oil in the emulsion is about 1% by weight. Even more preferably, the amount of silicone oil in the emulsion is about 0.8% by weight.

Figure 2:
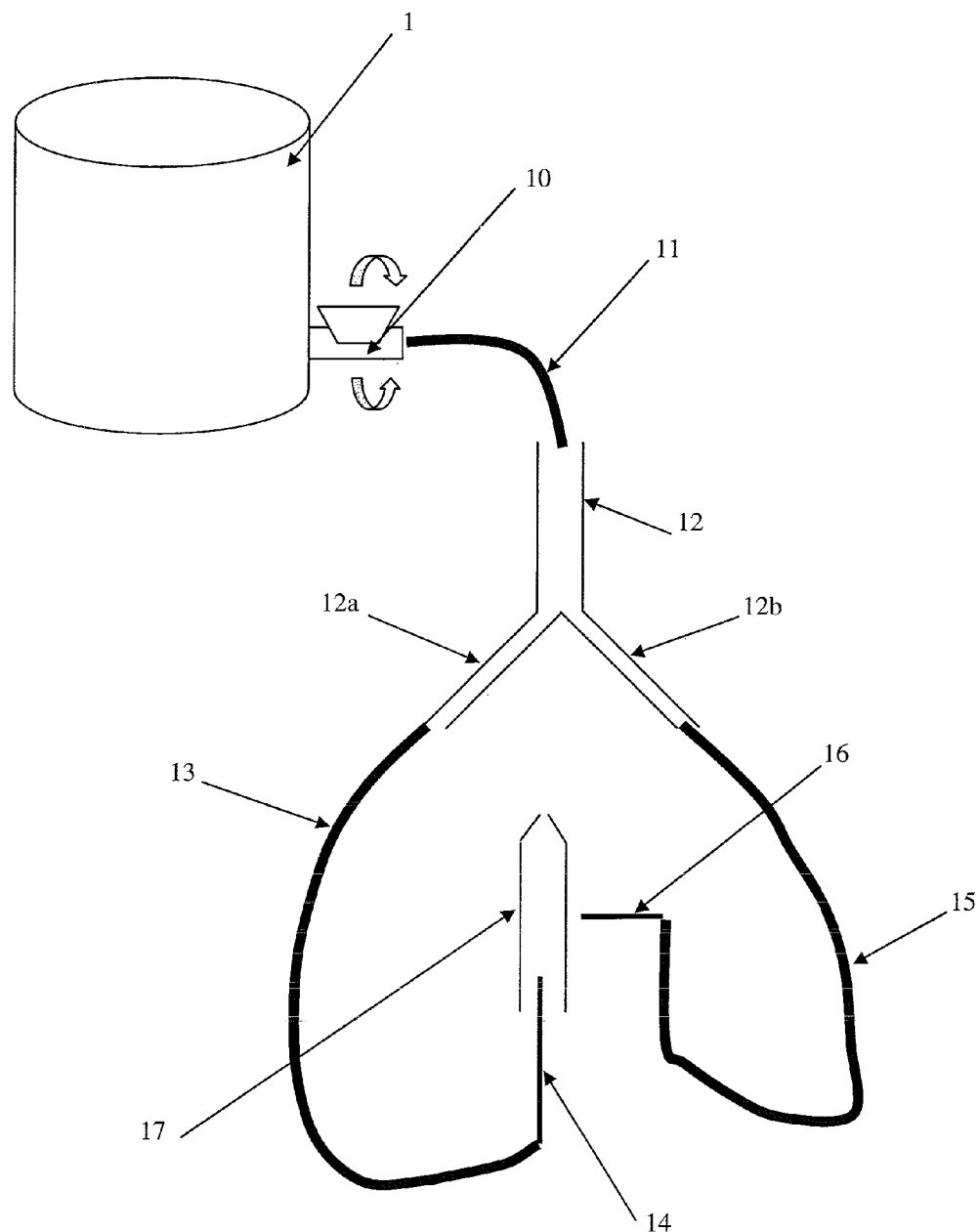
FIG. 2 is an illustration of the tubing assembly for silicone dosing.

In another embodiment, the present invention provides a method for siliconization of containers with a stable homogenous silicone oil-in-water emulsion substantially free of any additives. In this embodiment of the invention, the homogenous stable silicone oil-in-water emulsion, which is substantially free of additives, is sprayed onto the surfaces of containers. The setup is illustrated in FIG. 2. The preparation of the silicone oil-in-water emulsion from the homogenizer vessel (FIG. 1) followed by spraying into or onto the containers may be part of an assembly in which the preparation of the emulsion occurs in tandem with the spraying of the containers. Thus, as the emulsion is prepared, it is sprayed onto the surfaces of container's that approach it from the previous station of the assembly. The containers may be dried and baked as they pass on to the next station, which is usually the sterilization setup. In one embodiment, the silicone emulsion may be prepared and added to a vessel that sprays the emulsion onto or into the incoming container line, while additional batches of the emulsion are prepared. Subsequent to sterilization the containers are filled with the product, such as medicinal preparations, and then sealed.

Non-limiting examples of glass containers that may be siliconized include bottles, injection cartridges, IV infusions, syringes, vials and the like. Preferably, the containers are syringes, syringe cartridges and vials. Non-limiting examples of the product include pharmaceutical and medicinal preparations. Non-limiting examples of pharmaceutical and medicinal preparations include peptide, protein or alkaloid preparations such as preparations of Exenatide, Insulin, Pramlintide or Apomorphine.

The invention is further illustrated in the following illustrative examples, in which all parts, percentages and ratios are by weight unless otherwise indicated.

The homogenizer vessel (FIG. 1) for preparing the silicone oil-in-water emulsions of the present invention has a built in homogenizer-stirrer and may be maintained at low temperatures. The vessel (1), preferably of steel, is enclosed by a cooling jacket (2) also preferably of steel. The vessel contents are maintained at a fixed temperature by continually circulating a coolant, such as glycol, through the jacket. The coolant enters the jacket by means of inlet (3) and leaves by means of outlet (4). Along the vertical axis of the vessel is the time-regulated homogenizer-stirrer (5) for carrying out optimum emulsification of the emulsion. The components of the homogenizer-stirrer (5) include the homogenizer motor with timer (5a), the rotor (5b), and present at the lower end of the rotor (5b), rotor-blades (not seen in the figure). The rotor blades are enclosed by the homogenizer screen (5c) comprising orifices (5d) of about 1.5 mm. When the homogenizer stirrer is switched on, the rotating rotor blades drive the emulsion through the orifices (5d). The droplets (particles) of silicone oil formed are dispersed in the emulsion. The lid (6) of the vessel (1) includes an inlet port (7) for addition of more silicone oil-in-water emulsion, and a viewing port (8). Product outlet valve (10) and optional vessel handles (9) are also provided.

Example 1

Preparation of Silicone Oil-in-Water Emulsion—0.8% w/v

A silicone oil-in-water emulsion concentrate (10% w/v) is prepared by homogenizing silicone oil in water (at a water temperature of about 2-5° C.) for 5 minutes.

The silicone oil concentrate (10% w/v) is added to water at 2-5° C. to provide a final silicone oil-in-water emulsion with a concentration of 0.8% w/v. Care is taken to rinse all silicone oil residues into the final vessel. This mixture is homogenized for 10 minutes.

The 0.8% silicone oil-in-water emulsion is transferred into the homogenizer vessel (FIG. 1) and maintained at a temperature of 6-10° C.

As the vessel has an inlet port (7), multiple lots of silicone oil-in-water emulsion (0.8% w/v.) can be prepared as described. The silicone oil-in-water emulsion is homogenized in the vessel for at least about 10 minutes prior to being used. During use the rotor (5b) is turned on for 3 minutes every 10 minutes using a built in timer in the homogenizer-stirrer.

Example 2

Application of 0.8% Silicone Oil-in-Water Emulsion to Glass Cartridges (FIG. 2)

The emulsified silicone oil prepared in example 1 is transported through the product outlet valve (10) of the homogenizer vessel, which is connected to the spraying station at the cartridge washing machine. The connecting tubing is purged to prevent air locks.

Referring to FIG. 2, a length of (~64 cm) wide bore (inside diameter (I.D.) 6.3 mm) silicone tubing (1) is connected from the product outlet valve (10) of the homogenizer vessel to a "Y" adaptor (12). A length (~34 cm) of narrow bore (I.D. 3.2 mm) silicone tubing (13) is connected from one arm (12a) of the "Y" adaptor to the internal siliconizing needle assembly (14). A length (~40 cm) of narrow bore (I.D. 3.2 mm in diameter) silicone tubing (15) is connected from the other arm (12b) of the "Y" adaptor to the external siliconizing needle assembly (16). The 0.8% silicone oil-in-water oil emulsion can be sprayed into and onto the cartridges (17):

a) Inside—to provide lubrication for the plunger that is inserted later in the process; and
 b) Outside—to reduce friction of glass cartridges as they rub against each other during processing.

Baking of Silicone Oil onto the Glass Cartridge

The cartridges are passed through a sterilizing tunnel at 310° C. into a Class 100 area where final assembly occurs. This sterilizing tunnel has two functions:

a) to remove any microbiological or endotoxin residues from the cartridges,
 b) to remove water from the emulsion and dry the silicone oil onto the glass surface, Final Assembly and Cartridge Filling with Exenatide Preparation.

The glass cartridges are fed from the sterilizing tunnel onto a cartridge filling line where the following operations take place.

a. A rubber plunger is inserted into the bottom of the cartridge.
 b. The medicinal preparation comprising exenatide, is filled into the cartridge.
 c. A cap, including a rubber seal is crimped onto the cartridge.
 d. In-process controls are used to assess the functionality of the cartridge.

Final Assembly and Cartridge Filling with Insulin Preparation.

The glass cartridges are fed from the sterilizing tunnel onto a cartridge filling line where the following operations take place.
- e. A rubber plunger is inserted into the bottom of the cartridge.
- f. The medicinal preparation comprising insulin, is filled into the cartridge.
- g. A cap, including a rubber seal is crimped onto the cartridge.
- h. In-process controls are used to assess the functionality of the cartridge.

Final Assembly and Cartridge Filling with Apomorphine Preparation.

The glass cartridges are fed from the sterilizing tunnel onto a cartridge filling line where the following operations take place.
- i. A rubber plunger is inserted into the bottom of the cartridge,
- j. The medicinal preparation comprising Apomorphine, is filled into the cartridge.
- k. A cap, including a rubber seal is crimped onto the cartridge.

In-process controls are used to assess the functionality of the cartridge.

Final Assembly and Cartridge Filling with Pramlintide Preparation.

The glass cartridges are fed from the sterilizing tunnel onto a cartridge filling line where the following operations take place.
- l. A rubber plunger is inserted into the bottom of the cartridge.
- m. The medicinal preparation comprising Pramlintide, is filled into the cartridge.
- n. A cap, including a rubber seal is crimped onto the cartridge.

In-process controls are used to assess the functionality of the cartridge.

Example 3 a) Silicone Emulsion Stability

This experiment determines the stability of the silicone oil-in-water emulsion when prepared in accordance to the present invention. A 0.8% (w/v) silicone oil emulsion was prepared (10 L) and added to the jacketed homogenizer vessel, maintained at 10±2° C. and stirred for 3 minutes every 10 minutes. The emulsion is assayed for silicone content in the formulation at the start of the homogenization and then at hourly intervals up to 5 hours.

| Sample (hours) | Silicone oil concentration (% w/w) |
|---|---|
| 0 | 0.704 |
| 1 | 0.690 |
| 2 | 0.693 |
| 3 | 0.680 |
| 4 | 0.709 |
| 5 | 0.662 |

This illustrates that the silicone emulsions are stable for an extended period of time.

b) Effect of Stirring

This experiment establishes that there results a rapid reduction in the concentration of silicone oil in the formulation when the emulsion is left without stirring. A 10 L batch of 0.8% (w/v) silicone oil emulsion was prepared and added to the jacketed homogenizer vessel that was maintained at 10±2° C., but was left without stirring. The amount of silicone oil in the emulsion was assayed every hour up to 5 hours.

| Sample (hours) | Silicone oil concentration (% w/w) |
|---|---|
| 0 | 0.756 |
| 1 | 0.383 |
| 2 | 0.252 |
| 3 | 0.217 |
| 4 | * |
| 5 | 0.185 |

* data point unavailable as the evaporating dish contained residual water when the final weighing was made.

Comparing experiments a and b, it is clear that when the silicone oil-in-water emulsion is prepared in accordance with the present invention, the emulsion remains stable for at least 5 hours, viz. the concentration of silicone oil is maintained for at least 5 hours. On the other hand, when the emulsion is prepared in accordance to experiment b, viz. without stirring, the silicone oil concentration falls by about 50% within an hour.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure and the claims shown below are not limited to the illustrative embodiments set forth herein.

We claim:

1. A silicone oil-in-water emulsion comprising silicone oil and water wherein
   a. the amount of the silicone oil in the silicone oil-in-water emulsion is from about 0.1% to about 6% by weight; and
   b. the silicone oil-in-water emulsion contains less than 0.01% by weight emulsifiers and emulsion stabilizers
wherein the silicone oil-in-water emulsion is stable for at least five hours if maintained at 10±12° C. and stirred for 3 minutes every 10 minutes, and not stable for at least five hours if maintained at 10±12° C. without stirring.

2. The silicone oil-in-water emulsion as claimed in claim 1, wherein the emulsion is stable for at least about 15 minutes without stirring.

3. The silicone oil-in-water emulsion as claimed in claim 1, wherein the amount of silicone oil in the emulsion is from about 0.5% to about 3% by weight.

4. The silicone oil-in-water emulsion as claimed in claim 1, wherein the amount of silicone oil in the emulsion is about 1% by weight.

5. The silicone oil-in-water emulsion as claimed in claim 1, wherein the amount of silicone oil in the emulsion is about 0.8% by weight.

6. A process for the preparation of a stable silicone oil-in-water emulsion as claimed in claim 1, wherein the process comprises homogenization of a mixture consisting essentially of silicone oil and water at a temperature of less than about 20° C.

7. The process as claimed in claim 6, wherein the homogenization is conducted in cycles of about 3 minutes at 10-minute intervals.

8. A process for the siliconization of containers comprising applying to a container the silicone oil-in-water emulsion as claimed in claim 1.

9. The process as claimed in claim 8, wherein the container is selected from one or more of a bottle, injection cartridge, IV infusion, syringe, or vial.

10. The process as claimed in claim 9, further comprising adding to the container a medicinal composition comprising peptide, protein or alkaloid selected from group consisting of exenatide, pramlintide, insulin and apomorphine.

* * * * *

UNITED STATES PATENT AND TRADEMARK OFFICE
CERTIFICATE OF CORRECTION

PATENT NO. : 8,048,952 B2  
APPLICATION NO. : 11/763609  
DATED : November 1, 2011  
INVENTOR(S) : Neil Wynne and Michael Hudson et al.

Page 1 of 1

It is certified that error appears in the above-identified patent and that said Letters Patent is hereby corrected as shown below:

On the Title Page, Item (54) and Col. 1 line 1, Title: "Emulsions Formulation" should read --Emulsions - Formulations--.

Column 5, Line 24: "surfaces of container's that" should read --surfaces of containers that--.

Column 6, Line 33: "silicone tubing (1)" should read --silicone tubing (11)--.

Column 8, Line 45, Claim 1: "$10 \pm 12°$" should read --$10 \pm 2°$--.

Column 8, Line 47, Claim 1: "$10 \pm 12°$" should read --$10 \pm 2°$--.

Signed and Sealed this  
Twenty-sixth Day of June, 2012

David J. Kappos  
*Director of the United States Patent and Trademark Office*